US008531977B2

(12) United States Patent
Lin

(10) Patent No.: US 8,531,977 B2
(45) Date of Patent: Sep. 10, 2013

(54) SYSTEM RELIABILITY EVALUATION METHOD FOR ROUTING POLICY

(75) Inventor: Yi-Kuei Lin, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 865 days.

(21) Appl. No.: 12/656,862

(22) Filed: Feb. 18, 2010

(65) Prior Publication Data
US 2010/0315959 A1 Dec. 16, 2010

(30) Foreign Application Priority Data
Jun. 12, 2009 (TW) ................................ 98119659 A

(51) Int. Cl.
*H04J 3/14* (2006.01)
(52) U.S. Cl.
USPC .......................................... 370/248; 370/252
(58) Field of Classification Search
USPC .................... 370/252, 248; 706/21
See application file for complete search history.

(56) References Cited

U.S. PATENT DOCUMENTS

| 6,560,584 | B1 * | 5/2003 | Afshar et al. | 706/21 |
| 7,995,495 | B2 * | 8/2011 | Lin | 370/252 |
| 8,121,042 | B2 * | 2/2012 | Wang et al. | 370/248 |
| 2009/0083014 | A1 * | 3/2009 | Schallert | 703/6 |

OTHER PUBLICATIONS

Lin, Yi-Kuei, Optimal Routing Policy of a Stochastic-flow Network, Computers & Industrial Engineering 56, 2009, pp. 1414-1418, 2008 Elsevier Ltd.

* cited by examiner

*Primary Examiner* — Albert T Chou
(74) *Attorney, Agent, or Firm* — Bacon & Thomas, PLLC

(57) ABSTRACT

A system reliability evaluation method for routing policy is disclosed. The single minimal path of the routing policy includes plural arcs between a start node and a terminal node in a flow network. The method includes the steps of providing a virtual network in a computer for simulating the flow network; inputting a transmission requirement, a budget restriction and a time restriction; distributing the transmission requirement in a first minimal path of the virtual network for getting a first feasible probability; if the first minimal path is inactive, distributing the transmission requirement in a second minimal path of the virtual network and getting a first inactive probability of the first minimal path; getting a second feasible probability of the second minimal path; and computing a system feasible probability of the virtual network by the first feasible probability, the first inactive probability and the second feasible probability, defining the system reliability.

10 Claims, 3 Drawing Sheets

SYSTEM RELIABILITY EVALUATION METHOD FOR ROUTING POLICY

BACKGROUND OF THE INVENTION (1) Field of the Invention

The invention relates to a system reliability evaluation method for routing policy, and especially relates to a system reliability evaluation method for routing policy of a stochastic-flow network.

(2) Description of the Prior Art

With diversification of commodities and information services, the factors of flow, time and cost are progressively valued in network analysis, but said factors are set as deterministic. Thus, in operations research, computer science, networking and other areas, the quickest path problem has attracted great attention of researchers, and said problem is for finding a quickest path with minimum transmission time to send a given amount of data from the unique source to the unique sink. Since then, several variants of quickest path problems are proposed: constrained quickest path problem, the first k quickest paths problem, and all-pairs quickest path problem.

However, two factors, flow and time, are separately dealt in conventional network analysis. For instance, the largest capacity path problem deals with flow, and the shortest path problem is for finding the shortest transmission time if time is regarded as parameter. Two factors, flow and time, are first combined in the quickest path problem, and the transmission time reduced is an important issue through the real-life network, especially through computer and telecommunication networks.

Due to the factors of failure, maintenance, occupation, etc, the capacity of each arc is stochastic in many real flow networks such as computer system, telecommunication system, logistic system and transportation system, etc. Because the capacity is influenced with said factors, the capacity should be not fixed. Such a network is named a stochastic-flow network. For example, in the computer system, each computer (or switch) represents a node, and each transmission line represents an arc. The transmission line is composed by plural real-life network lines (such as coaxial cables, fiber optics, etc), and each network line has two cases of normal and failure; that implies the transmission line has several states in which state k means k physical lines are successful. Thus each transmission line has plural states, and capacity of each arc has plural values accordingly Thus, in computer and telecommunication networks, when the given amount of data is sent through several minimal paths, how to find the quickest transmission method in several various factors, calculate a system reliability denoted successful probability of transmitting the given amount of data in time restriction, and accord with the reserved paths for contribution to the system reliability. Namely, finding the best routing policy in time and cost restriction is an important issue to conduct the system reliability evaluation method for a stochastic-flow network.

SUMMARY OF THE INVENTION

Accordingly, the object of the invention is to provide a system reliability evaluation method for routing policy. With setting the restriction of the transmission time and the transmission cost between a start node and a terminal node in a flow network, calculating the probability satisfied by the restriction to evaluate the quality of service for customer.

In one aspect, the invention provides a system reliability evaluation method for routing policy is disclosed. The single minimal path of the routing policy includes plural arcs between a start node and a terminal node in a flow network, wherein each of the minimal paths is an ordered sequence of the arcs between the start node to the terminal node without loops. The method includes the steps of providing a virtual network in a computer for simulating the flow network; inputting a transmission requirement, a budget restriction and a time restriction; distributing the transmission requirement in a first minimal path of the virtual network and calculating a first feasible probability therein according to the transmission requirement and the time restriction; if the first minimal path is in an unfeasible state, distributing the transmission requirement in a second minimal path of the virtual network, and calculating a first unfeasible probability of the first minimal path; then calculating a second feasible probability of the second minimal path; by the operation unit, integrating the first feasible probability, the first unfeasible probability and the second feasible probability into a system feasible probability of the virtue network, defined as a system reliability.

In an experiment, the step further includes: if the first minimal path is in a feasible state, defining the first feasible probability as the system reliability.

In an experiment, the steps of distributing the transmission requirement in one of the minimal paths include: selecting the minimal paths of the virtual network; calculating a flow in each of the minimal paths; and transferring the flow in each of the minimal paths into a capacity of each of the arcs. Wherein the steps of calculating the flow of the minimal path include: providing a lead time for each of the arcs in the minimal path; with a transmission time lower than or equal to the time restriction, calculating the flow of the minimal path, wherein the transmission time equals to the sum of the lead time and the transmission requirement divided by the flow of the minimal path; and judging if a lower boundary vector exists, when the flow of the minimal path is smaller than a maximum capacity of the minimal path.

In an experiment, the steps of calculating the feasible probabilities include: according to the transmission requirement, the time restriction, the budget restriction and a transmission time which is smaller than or equal to the time restriction, calculating, a maximum flow in each of the arcs in the minimal path per unit time accordingly, regarded as a capacity of the arc; defining a capacity vector composed by the capacities of the arcs, the capacities being stochastic to correspond with the flow distribution state of the flow network; executing a budget check by the operation unit to check if a transmission cost satisfies the budget restriction for sending the transmission requirement in the minimal path; defining the capacity vector as a lower boundary vector when the transmission cost and the transmission time of the minimal path are less than or equal to the budget restriction and the time restriction respectively; and calculating the probability that the capacity vector of any minimal path is larger than or equal to the lower boundary vector of the minimal path, and defining said probability as the feasible probability of the flow network.

Said methods of calculating the feasible probabilities include inclusion-exclusion rule, disjoint-event method and state-space decomposition are applied in.

In an experiment, above system reliability evaluation method further includes: defining an expectation of the transmission ability of the flow network as product of the system reliability and the transmission requirement, and defining an expectation of the transmission time of the flow network as product of the system reliability and the time restriction.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
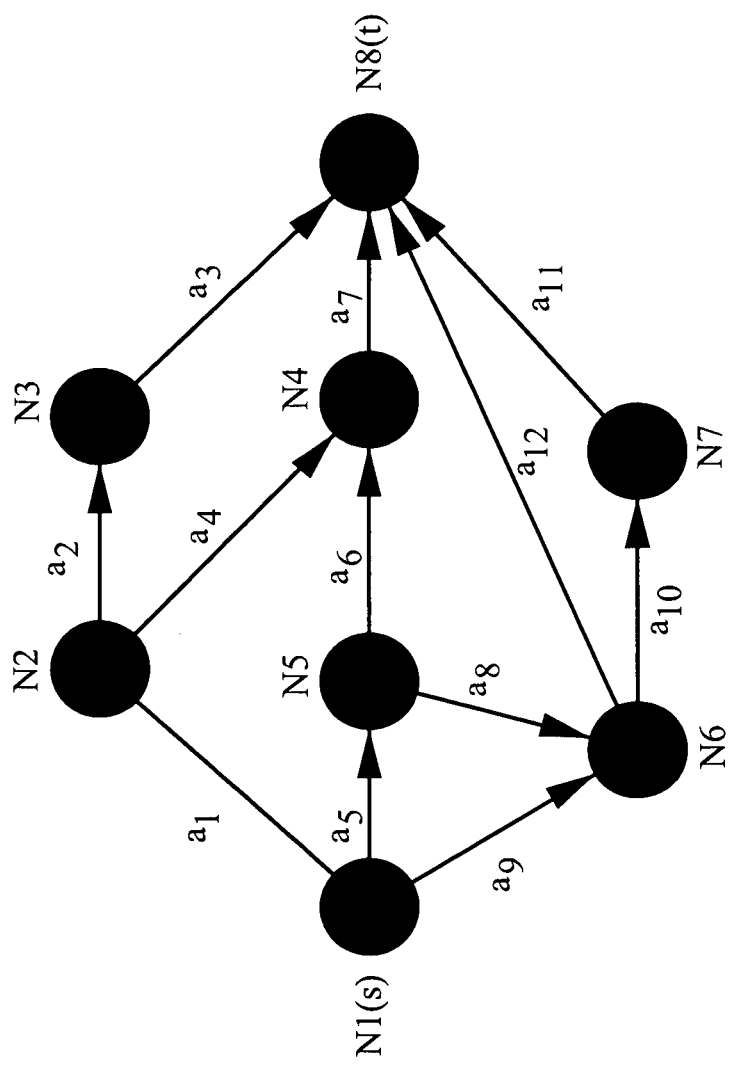
FIG. 1 is a schematic view of an embodiment of the virtual network according to the present invention.

Refer to FIG. 1 for a stochastic-flow network with a start node s and a terminal node t, where N stands for all nodes, $a_i$ for all arcs, each arc $a_i$ connecting two nodes in N. The flow network can be an information network, a telecommunication network, a logistic network or a transportation network.

The present invention provides a system reliability evaluation method for routing policy. The system reliability means the probability that the stochastic-flow network is able to send a specific amount of data from a single start node to a single terminal node by a single minimal path within a given time under a budget restriction. From the point of quality management, it is the probability of satisfying transmission requirement in a specific time, which is treated as a performance index of the service system.

For evaluating the system reliability of a real-life flow network, a computer is used in the present invention to run a reliability evaluation software which provides a network model for simulating the real-life flow network.

Figure 2:
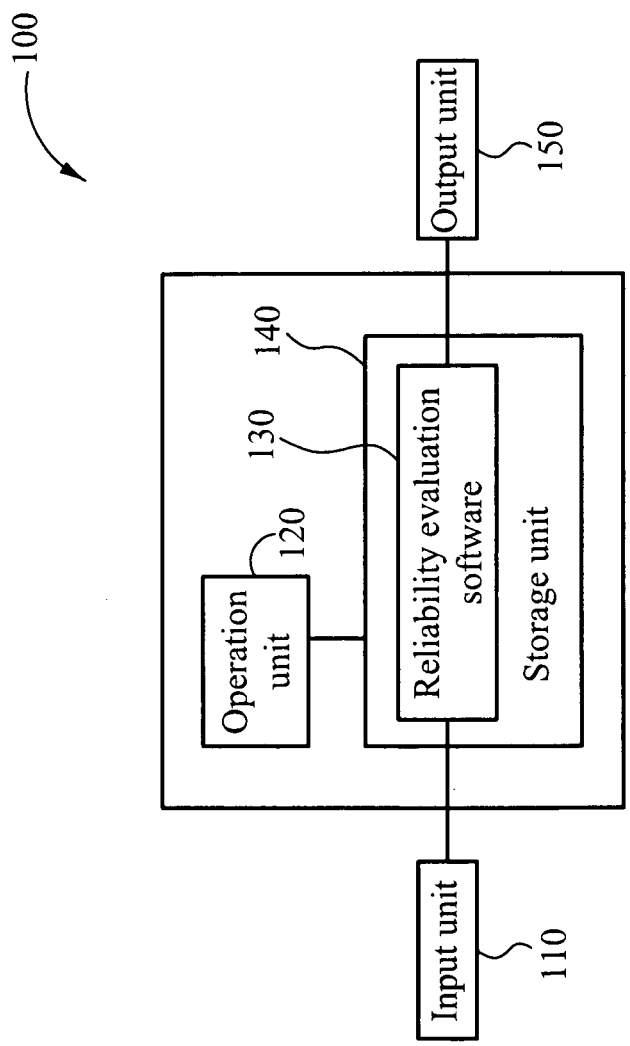
FIG. 2 is a block diagram of the hardware executing an embodiment of the system reliability evaluation method for routing policy according to the present invention.

Refer to FIG. 2 for a block diagram of the hardware in the system reliability evaluation method for routing policy according to the present invention. A computer 100 has an input unit 110, an operation unit 120, a storage unit 140 and an output unit 150. The input unit 110 is a keyboard or a handwriting input device. The operation unit 120 is a central processing unit (CPU). The storage unit 140 is a hardware electrically connected to the input unit 110, the operation unit 120 and the output unit 150. A reliability evaluation software 130 is installed in the hardware. The output unit 150 is a display or a printer.

Figure 3:
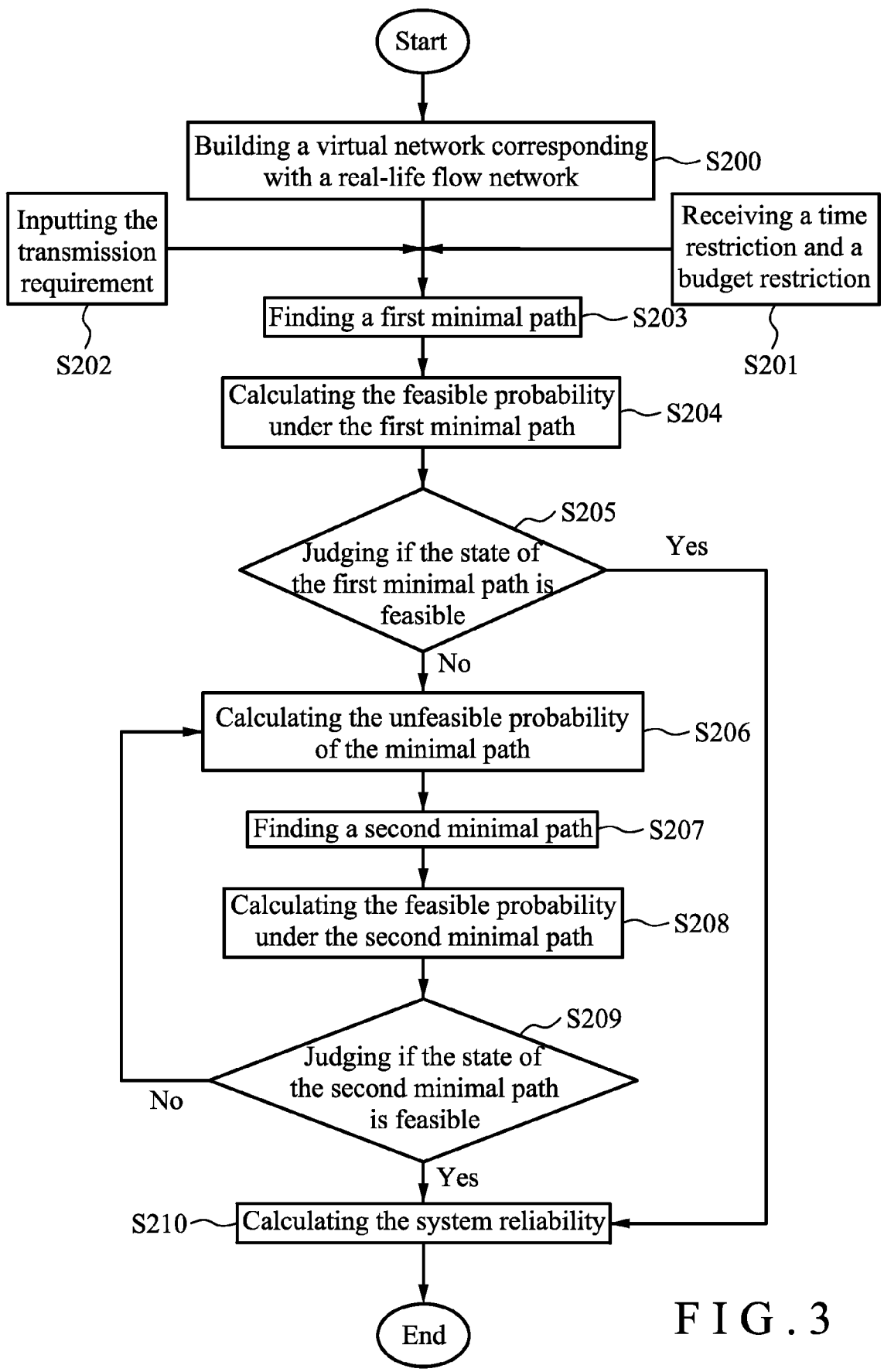
FIG. 3 is a flow chart of the software executing an embodiment of the system reliability evaluation method routing policy according to the present invention.

Refer to FIG. 3 for a flow chart of the system reliability software 140 executing the system reliability evaluation method for routing policy according to the present invention. The method includes the steps of:

Step (S200): building a virtual network to correspond with the real-life flow network in the network model according to number of the nodes N and the arcs $a_i$ in the real-life flow network. Supposing that the network is a binary-state system, and each arc has two cases of normal and failure. All minimal paths $P_j = \{a_{j1}, a_{j2}, \ldots, a_{jn_j}\}$ between the start node s to the terminal node t in the virtual network are selected. The minimal path is required to be an ordered sequence of the arcs $a_i$ between the start node s to the terminal node t without loops.

Step (S201): receiving a time restriction T and a budget restriction B set by the user.

Step (S202): inputting the transmission requirement d of goods, commodities or data from the input unit 110 by user.

Step (S203): given the transmission requirement d and the time restriction T, investigating flow distribution of the flow network under the minimal path, distributing the transmission requirement d in a first minimal path $P_1$ of the virtual network between the start node s and the terminal node t for calculating the flow in the first minimal path $P_1$ under the time restriction T.

Step (S204): calculating a maximum flow of each arc $a_i$ per unit time accordingly, which is regarded as a capacity $x_i$ of the arc $a_i$ according to the flow in the first minimal path $P_1$. Getting a capacity vector $X \equiv (x_1, x_2, \ldots, x_n)$ to represent the current state of each arc $a_i$ of the first minimal path $P_1$. The capacity vector X is composed by the capacities $x_1, x_2, \ldots, x_n$ of the arcs. The capacities are stochastic to correspond with the flow distribution of the flow network.

Under the capacity vector X of certain flow distribution, the operation unit checking if the transmission cost $F(P_j)$ satisfies the budget restriction B for sending the transmission requirement d in the minimal path. Defining a lower boundary vector of making the flow network satisfy the lowest boundary of the time restriction T and the budget restriction B. Any capacity vector larger than the lower boundary vector can satisfy the requirement of sending the transmission requirement d under the time restriction T and the budget restriction B. In other words, from the capacity vectors X relative to the flow distribution, all lower boundary vectors lower than or equal to the time restriction T and the budget restriction B can be selected. Applying inclusion-exclusion rule, disjoint-event method or state-space decomposition to calculate a first feasible probability $Pr(S_1)$ of the capacity vector X larger than or equal to the lower boundary vector, which is the probability that the flow network satisfies the transmission requirement d.

Step (S205): judging if the state of every arc in the first minimal path $P_1$ is feasible.

Step (S206): if one of the states of all arcs in the first minimal path $P_1$ is unfeasible, calculating a first unfeasible probability $Pr(E_1)$, which is the probability that the capacity vector X is unable to satisfy the lower boundary vector in the virtual network.

Step (S207): distributing the transmission requirement d in a second minimal path $P_2$ of the virtual network between the start node s and the terminal node t for calculating the flow in the second minimal path $P_2$ under the time restriction T as step (S203).

Step (S208): calculating a second feasible probability $Pr(S_2)$ of the capacity vector X larger than or equal to the lower boundary vector as step (S204).

Step (S209): judging if the state of every arc in the second minimal path $P_2$ is feasible, yes for performing step (S210), no for executing the process from step (S206) to step (S208) for the next minimal path.

Step (S210): due to many possibilities of the lower boundary vector calculated in step (S204) and step (S208), integrating said first feasible probability, said first unfeasible probability and said second feasible probability into a system feasible probability, which is the probability that the flow network satisfies the transmission requirement d, called the system reliability, represented by $R_{d,T,B}$.

Additionally, an expectation of transmission ability of the flow network is defined as product of the system reliability $R_{d,T,B}$ and the transmission requirement d, and an expectation of transmission time of the flow network is defined as product of the system reliability $R_{d,T,B}$ and the time restriction T. Thus, after calculating the system reliability $R_{d,T,B}$, $$\sum_d R_{d,T,B} \times d$$

is the expected transmission ability of the flow network and $$\sum_T R_{d,T,B} \times T$$

is the expected transmission time of sending d units of data under the time restriction T.

After calculating the system reliability, the specified routing policy is analyzed by said system reliability to find the arcs and the nodes influentially injuring or contributing to the transmitting efficiency of the flow network.

Refer to FIG. 1 for a benchmark network to illustrate the proposed algorithm. The algorithm and an embodiment are presented in following text.

Let G≡(N, A, L, M, C) denotes a stochastic-flow network where N denoting the set of nodes, A {$a_i$|1≦i≦n} denoting the set of arcs, L≡($l_1, l_2, \ldots, l_n$) with $l_i$ denoting the lead time of $a_i$ and M≡($M_1, M_2, \ldots, M_n$) with $M_i$ denoting the maximal capacity of $a_i$, C≡{$c_i$|1≦i≦n} with $c_i$ denoting the transmission cost of arc $a_i$ per unit of data. The capacity is the maximal number of data sent through the medium (an arc or a path) per unit of time. In the stochastic-flow network, the current capacity of arc $a_i$ is stochastic, denoted by $x_i$, taking values $0=b_{i1}<b_{i2}< \ldots <b_{ir_i}=M_i$, where $b_{ij}$ is an integer for j=1, 2, …, $r_i$. The vector X≡($x_1, x_2, \ldots, x_n$) denotes the capacity vector.

If the flow in the flow network is able to satisfy the transmission requirement d and the capacity of the arcs under the time restriction and the budget restriction at the same time, the transmission of the flow network is defined as a success.

In this flow network, assuming each node N is perfectly reliable, the capacities of different arcs are statistically independent and all transmission requirement such as data and commodities are sent through one minimal path. The comparisons of vectors are:

Y≧X ($y_1, y_2, \ldots, y_n$)≧($x_1, x_2, \ldots, x_n$): $y_i$≧$x_i$ for each i=1, 2, …, n.

Y≧X ($y_1, y_2, \ldots, y_n$)>($x_1, x_2, \ldots, x_n$): Y≧X and $y_i$>$x_i$ for at least one i.

Suppose that $P_1, P_2, \ldots, P_m$ are minimal paths of G from start s to terminal t. With respect to each $P_j$={$a_{j1}, a_{j2}, \ldots, a_{jn_j}$}, the maximum capacity under the capacity vector $$X \text{ is } \min_{1 \leq k \leq n_j}(x_{jk}).$$

If d units of data are required to be transmitted through minimal path $P_j$ under the capacity vector X and the budget restriction B, then the transmission time, denoted by $\Psi(d, X, B, P_j)$, is lower than or equal to the time restriction, represented by:

$$\text{lead time of } P_j + \left\lceil \frac{d}{\text{the capacity of } P_j} \right\rceil = \sum_{k=1}^{n_j} l_{jk} + \left\lceil \frac{d}{\min_{1 \leq k \leq n_j} x_{jk}} \right\rceil, \quad (1)$$

where ⌈x⌉ is the smallest integer such that ⌈x⌉≧x. Any capacity vector X with $\Psi(d, X, B, P_j) \leq T$ means that the network can send d units of data from the start node s to the terminal node t within time restriction T under the capacity vector X and budget restriction B.

If X is a minimal capacity vector such that the network can send d units of data within T units of time, then X is called a lower boundary vector. It is trivial that (i) $\Psi(d, X, B, P_j) \leq T$ and (2) Y<X, $\Psi(d, X, B, P_j)>T$ for any capacity vector. $\Omega_j$ represents the set of the capacity vectors X and $\Omega_{j,min}$ represents the set of the lower boundary vectors. The system reliability $R_{d,T,B}$ is a feasible probability $Pr\{X|\Psi(d, X, B, P_j) \leq T\}$ at this time.

Several methods such as inclusion-exclusion rule, disjoint-event method and state-space decomposition are able to be applied to calculate the system reliability $R_{d,T,B}$. Note that $Pr\{X \geq Y\} = Pr\{x_1 \geq y_1\} \times Pr\{x_2 \geq y_2\} \times \ldots \times Pr\{x_n \geq y_n\}$ if Y=($y_1, y_2, \ldots, y_n$).

The algorithm to evaluate the system reliability is as follows:

Step 1. For each minimal path $P_j$={$a_{j1}, a_{j2}, \ldots, a_{jn_j}$}, find the minimal capacity vector $Z_j$=($z_1, z_2, \ldots, z_n$) such that the network sends d units of data within T units of time.

1. Find the minimal capacity h of the minimal path $P_j$ such that d units of data can be sent through the minimal path $P_j$ within T units of time. That is, find the smallest integer h such that $$\sum_{k=1}^{n_j} l_{jk} + \left\lceil \frac{d}{h} \right\rceil \leq T. \quad (2)$$

2. If $$h \leq \min_{1 \leq k \leq n_j} (M_{jk})$$

then $Z_j$ can be obtained according to:

$$\begin{cases} z_i = \text{the minimal capacity } u \text{ of } a_i \text{ such that } u \geq v_j & \text{if } a_i \in P_j, \\ z_i = 0 & \text{if } a_i \notin P_j. \end{cases} \quad (3)$$

Otherwise, $Z_j$ does not exist.

Step 2. For each minimal path $P_j = \{a_{j1}, a_{j2}, \ldots, a_{jn_j}\}$, check if it satisfies the budget restriction B.

1. Calculate the transmission cost $$F(P_j) = \sum_{i=1}^{n_j} (d \cdot c_{ji})$$

of the minimal path $P_j$.

2. If $F(P_j) > B$, then the lower boundary vector $Z_j$ does not exist.

Step 3. If $Z_j$ exists, then $B_j = \{X | X \geq Z_j\}$; Otherwise, $B_j = \phi$. Then the system reliability is $$Pr\left\{\bigcup_{j=1}^{m} B_j\right\}.$$

The network administrator decides the routing policy in advance to indicate a first priority minimal path (MP), a second priority minimal path (MP) (or named alternative MP), etc.

Supposing that the first minimal path is the first priority minimal path, the second minimal path, which is the alternative second priority minimal path, will be responsible for the transmission duty if the first priority minimal path fails. The minimal path fails if and only if at least one arc in it fails. Such that the level of routing policy is called a first level. Similarly, supposing that the second minimal path is the second priority minimal path, the third minimal path, which is an alternative third priority minimal path, will be responsible for the transmission duty if the second priority minimal path fails. Such that the level of routing policy is a second level if two alternative MPs are standing by. In this embodiment, perform said evaluation method for routing policy in flow network to calculate the system reliability at the first level. Let $E_j$ denote the event that $P_j$ fails, and $S_j$ denote the event that $P_j$ is able to send d units of data within time T. Then, the unfeasible probability is:

$$Pr(E_j) = Pr(x_i = 0 \text{ for at least one } a_i \in P_j) = 1 - \prod_{i: a_i \in P_j} Pr(x_i \geq 1), \quad (4)$$

$$j = 1, 2$$

Indicate that $\Omega_{j,min} = \{Z_j\}$ where $Z_j$ is generated from the algorithm. Thus, the jth feasible probability, denoted by $Pr(S_j)$, is represented by:

$$Pr(S_j) = Pr\{\Omega_{j,min}\} = Pr\{X | X \geq Z_j\} = \prod_{i: a_i \in P_j} Pr(x_i \geq z_i), \, j = 1, 2. \quad (5)$$

The system reliability $R_{d,T,B}$ is the feasible probability that the network is able to send d units of data within time T. If the state of every arc in the second minimal path is feasible, the system reliability $R_{d,T,B}$ is $$R_{d,T,B} = Pr(S_1) + Pr(S_2 | E_1) \times Pr(E_1) \quad (6)$$

$$= Pr(S_1) + Pr(S_2) \times Pr(E_1)$$

$$= \prod_{i: a_i \in P_1} Pr(x_i \geq z_i) + \prod_{i: a_i \in P_2} Pr(x_i \geq z_i) \times \left(1 - \prod_{i: a_i \in P_1} Pr(x_i \geq 1)\right).$$

Step 1 and step 2 are alternative with each other. Use the benchmark network in FIG. 1 to illustrate the proposed algorithm. The capacity, budget, and the lead time of each of the arcs are shown in Table 1. In a first embodiment, if 20 units of data are required to be sent from start to terminal within 15 units of time under 200 units of budget. Then all lower boundary vectors and the system reliability to meet such a requirement can be derived as follows:

TABLE 1

The arc data of FIG. 1

| Arc | Capacity | Probability | Lead time |
|-----|----------|-------------|-----------|
| a1  | 5[a]     | 0.85        | 2         |
|     | 3        | 0.05        |           |
|     | 1        | 0.05        |           |
|     | 0        | 0.05        |           |
| a2  | 5        | 0.80        | 1         |
|     | 3        | 0.10        |           |
|     | 1        | 0.05        |           |
|     | 0        | 0.05        |           |
| a3  | 4        | 0.85        | 3         |
|     | 2        | 0.05        |           |
|     | 1        | 0.05        |           |
|     | 0        | 0.05        |           |
| a4  | 3        | 0.90        | 3         |
|     | 1        | 0.05        |           |
|     | 0        | 0.05        |           |
| a5  | 5        | 0.85        | 2         |
|     | 3        | 0.05        |           |
|     | 1        | 0.05        |           |
|     | 0        | 0.05        |           |
| a6  | 6        | 0.80        | 2         |
|     | 4        | 0.05        |           |
|     | 2        | 0.05        |           |
|     | 1        | 0.05        |           |
|     | 0        | 0.05        |           |
| a7  | 4        | 0.85        | 3         |
|     | 2        | 0.05        |           |
|     | 1        | 0.05        |           |
|     | 0        | 0.05        |           |
| a8  | 2        | 0.95        | 1         |
|     | 0        | 0.05        |           |
| a9  | 5        | 0.60        | 2         |
|     | 3        | 0.20        |           |
|     | 2        | 0.10        |           |
|     | 1        | 0.05        |           |
|     | 0        | 0.05        |           |
| a10 | 7        | 0.65        | 2         |
|     | 5        | 0.10        |           |
|     | 4        | 0.10        |           |
|     | 2        | 0.05        |           |
|     | 1        | 0.05        |           |
|     | 0        | 0.05        |           |

TABLE 1-continued

The arc data of FIG. 1

| Arc | Capacity | Probability | Lead time |
|-----|----------|-------------|-----------|
| a11 | 6 | 0.70 | 1 |
|     | 4 | 0.10 |   |
|     | 2 | 0.10 |   |
|     | 1 | 0.05 |   |
|     | 0 | 0.05 |   |
| a12 | 2 | 0.95 | 2 |
|     | 0 | 0.05 |   |

[a] Pr{the capacity of $a_1$ is 5} = 0.85.

For the first minimal path $P_1=\{a_1, a_2, a_3\}$:

1. The transmission cost $F(P_1)=20\times(3+4+1)=160$ is smaller the budget restriction B.

2. The lead time of $P_1$ is $l_1+l_2+l_3=6$. Then $v_1=3$ is the smallest integer such that $$\left(6 + \left\lceil \frac{20}{v_1} \right\rceil\right) \leq 15.$$

2. The maximal capacity of $P_1$ is min{5,5,4}=4. So, $z_1=3$, $z_2=3$, $z_3=4$ and $z_i=0$ for others. Thus, $Z_1=(3,3,4,0,0,0,0,0,0,0,0,0)$.

For the second minimal path $P_2=\{a_5, a_6, a_n\}$:

1. The transmission cost $F(P_2)=20\times(3+4+1)=160$ is smaller the budget restriction B.

2. The lead time of $P_2$ is $l_5+l_6+l_7=7$. Then $v_2=3$ is the smallest integer such that $$\left(7 + \left\lceil \frac{20}{v_2} \right\rceil\right) \leq 15.$$

3. The maximal capacity of $P_2$ is min{5,6,4}=4. So, $z_5=3$, $z_6=4$, $z_7=4$ and $z_i=0$ for others. Thus, $Z_2=(0,0,0,0,3,4,4,0,0,0,0,0)$.

In the process to evaluate the system reliability $R_{20,15,200}$, $$Pr(S_1) = Pr\{X \mid X \geq (3, 3, 4, 0, 0, 0, 0, 0, 0, 0, 0, 0)\}$$
$$= Pr\{x_1 \geq 3\} \times Pr\{x_2 \geq 3\} \times Pr\{x_3 \geq 4\} \times Pr\{x_4 \geq 0\} \times$$
$$Pr\{x_5 \geq 0\} \times Pr\{x_6 \geq 0\} \times Pr\{x_7 \geq 0\} \times Pr\{x_8 \geq 0\} \times Pr\{x_9 \geq 0\} \times$$
$$Pr\{x_{10} \geq 0\} \times Pr\{x_{11} \geq 0\} \times Pr\{x_{12} \geq 0\}$$
$$= 0.9 \times 0.9 \times 0.85$$
$$= 0.6885,$$

$$Pr(S_2) = Pr\{X \mid X \geq (0, 0, 0, 0, 3, 4, 4, 0, 0, 0, 0, 0)\}$$
$$= Pr\{x_5 \geq 3\} \times Pr\{x_6 \geq 4\} \times Pr\{x_7 \geq 4\}$$
$$= 0.9 \times 0.85 \times 0.85$$
$$= 0.65025.$$

$$Pr(E_1) = 1 - Pr\{x_1 \geq 1\} \times Pr\{x_2 \geq 1\} \times Pr\{x_3 \geq 1\}$$
$$= 0.1426525.$$

$$R_{20,15} = Pr(S_1) + Pr(S_2) \times Pr(E_1)$$
$$= 0.6885 + 0.65025 \times 0.142625$$
$$= 0.781241906.$$

In a second embodiment, the unit of the time restriction T is loosened to be 18 from 15, then $v_1=2$, $v_2=2$, $Z_1=(3,3,2,0,0,0,0,0,0,0,0,0)$ and $Z_2=(0,0,0,0,3,2,2,0,0,0,0,0)$. The system reliability $R_{20,18,200}$ increases to 0.832973625 where $Pr(S_1)=0.729$ and $Pr(S_2)=0.729$.

In FIG. 1, $P_1=\{a_1, a_2, a_3\}$, $P_2=\{a_5, a_6, a_7\}$, and $P_3=\{a_9, a_{10}, a_{11}\}$ are three disjoint minimal paths (MPs) in the virtual network. Under the requirement that d=20, B=200 and T=15, it is known that $Pr(S_1)=0.6885$ and $Pr(S_2)=0.65025$ from the first embodiment. Obtain a third feasible probability $Pr(S_3)=0.729$ after running the algorithm for a third minimal path $P_3$. In a third embodiment, the third minimal path $P_3$ is the first priority minimal path and the first minimal path $P_1$ is the second priority minimal path according to the step. 2 and the step. 3 form the algorithm. Under this routing policy, $R_{20,15,200}=Pr(S_3)+Pr(S_1)\times Pr(E_3)=0.729+0.6885\times 0.142625=0.829693125$ which is larger than the system reliability with respect to the routing policy in the first embodiment. Table 2, which lists the system reliabilities with respect to different routing policies, shows the optimal routing policy is obtained from the proposed procedure.

TABLE 2

System reliabilities for different routing policies

| First priority MP | $P_1$ | $P_2$ | $P_1$ | $P_3$ | $P_2$ | $P_3$ |
|---|---|---|---|---|---|---|
| Second priority MP | $P_2$ | $P_1$ | $P_3$ | $P_1$ | $P_3$ | $P_2$ |
| System reliability | 0.7812419 | 0.7484473 | 0.7924736 | 0.8296931 | 0.7542236 | 0.8217419 |

In an embodiment, for the routing policy with the second level, the second priority minimal path takes charge of the transmission duty if the first priority MP fails, and the third priority MP takes charge if the second priority MP fails. Under the routing policy with the second level, the system reliability $R_{d,T,B}$ is $$R_{d,T,B} = Pr(S_1) + Pr(S_2 \mid E_1) \times Pr(E_1) + Pr(S_3 \mid E_1E_2) \times Pr(E_1E_2) \quad (7)$$

$$= Pr(S_1) + Pr(S_2) \times Pr(E_1) + Pr(S_3) \times Pr(E_1) \times Pr(E_2)$$

$$= \prod_{i:a_i \in P_1} Pr(x_i \geq z_i) + \prod_{i:a_i \in P_2} Pr(x_i \geq z_i) \times \left(1 - \prod_{i:a_i \in P_1} Pr(x_i \geq 1)\right) +$$

$$\prod_{i:a_i \in P_3} Pr(x_i \geq z_i) \times \left(1 - \prod_{i:a_i \in P_1} Pr(x_i \geq 1)\right) \times$$

$$\left(1 - \prod_{i:a_i \in P_2} Pr(x_i \geq 1)\right).$$

Utilize the data in the first embodiment to evaluate the system reliability if $P_1$, $P_2$ and $P_3$ are the first, second and third priority MP, respectively. Then, $$R_{20,15,200} = Pr(S_1) + Pr(S_2) \times Pr(E_1) + Pr(S_3) \times Pr(E_1) \times Pr(E_2)$$

$$= 0.6885 + 0.65025 \times 0.142625 + 0.729 \times 0.142625 \times 0.142625$$

$$= 0.796071144.$$

In another embodiment, as the sort criteria in the algorithm to determine the optimal routing policy, $P_3$, $P_1$ and $P_2$ should be ordered from the first, second and third priority MP, respectively. Then, the system reliability increases to 0.840424626 as follows.

$$R_{20,15,200} = Pr(S_3) + Pr(S_1) \times Pr(E_3) + Pr(S_2) \times Pr(E_3) \times Pr(E_1)$$

$$= 0.729 + 0.6885 \times 0.142625 + 0.65025 \times 0.1426525 \times$$

$$0.142625$$

$$= 0.840424626.$$

In order to obtain higher system reliability, extend the above procedure to the routing policy with a third level, a fourth level, and so on.

Above all, users need to input the transmission requirement d, the budget restriction B, the time restriction T and the lead time L according to the present invention. The lead time L depends on the processing time of the given amount of data in real-life flow network, such as computer system, telecommunication system, logistic system and transportation system. Based on the inputted data, the system reliability can be outputted in terms of flow distribution, budget check and time check.

Actually, the present method is suitable for the system with time and capacity characters, such as computer system, telecommunication system and transportation system. From the point of quality management, the system reliability can be regarded as a performance index. The present method can be extended to a constrained quickest path problem, k quickest paths problem and all-pairs quickest path problem.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A system reliability evaluation method for routing policy, using a computer having an input unit, an operation unit, a storage unit and an output unit electrically connected with each other, the computer executing a reliability evaluation software which provides a virtual network for simulating a flow network, the virtual network having a start node, a terminal node and plural arcs between the start node and the terminal node for constituting plural minimal paths, the steps of the method comprising:

storing the reliability evaluation software in the storage unit;

the input unit receiving a transmission requirement, a time restriction and a budget restriction inputted by users, wherein the transmission requirement is data sent through the virtual network;

defining a transmission time as time for sending the transmission requirement from the start node to the terminal node, and the transmission time lower than or equal to the time restriction in the reliability evaluation software;

defining each of the minimal paths as an ordered sequence of the arcs from the start node to the terminal node without loops in the virtual network of the reliability evaluation software;

defining the minimal paths of the virtual network including a first minimal path and a second minimal path in the reliability evaluation software, and setting the transmission requirement into the first minimal path of the virtual network;

the operation unit judging whether the first minimal path is in a feasible state or an unfeasible state, wherein the feasible state is the flow network larger than or equal to the transmission requirement, and the unfeasible state is the flow network smaller than the transmission requirement;

if the first minimal path is in a feasible state, the operation unit calculating a first feasible probability of the first minimal path in the virtual network according to the transmission requirement, the time restriction and the budget restriction, wherein the first feasible probability is a probability of the flow network larger than or equal to the transmission requirement;

if the first minimal path is in an unfeasible state, setting the transmission requirement into the second minimal path of the virtual network and calculating a first unfeasible probability of the first minimal path and the second feasible probability of the second minimal path in the virtual network in the virtual network according to the transmission requirement, the time restriction and the budget restriction, wherein the first unfeasible probability is a probability of the flow network smaller than the transmission requirement, and the second feasible probability is a probability of the flow network larger than or equal to the transmission requirement;

the operation unit integrating the first feasible probability, the first unfeasible probability and the second feasible probability into a system feasible probability of the virtual network, and defining the system feasible probability as a system reliability of the flow network; and displaying the system reliability on the output unit.

2. The system reliability evaluation method for routing policy of claim 1, further comprising:
if the first minimal path is in a feasible state, defining the first feasible probability as the system reliability.

3. The system reliability evaluation method for routing policy of claim 1, wherein the steps of the operation unit setting the transmission requirement into one of the minimal paths comprise:
the operation unit selecting the minimal paths of the virtual network, wherein each of the minimal paths is an ordered sequence of the arcs between the start node to the terminal node without loops; and
defining each of the minimal paths having a flow, and the operation unit transferring the flow in each of the minimal paths into a capacity of each of the arcs.

4. The system reliability evaluation method for routing policy of claim 3, further comprising:
defining a lead time as a time for a data sent through one of the arcs in the minimal path;
with a transmission time lower than or equal to the time restriction, calculating the flow of the minimal path, wherein the transmission time equals to the sum of the lead time and the transmission requirement divided by the flow of the minimal path; and
the operation unit judging if a lower boundary vector exists, when the flow of the minimal path is smaller than a maximum capacity of the minimal path.

5. The system reliability evaluation method for routing policy of claim 1, wherein the steps of the operation unit calculating the feasible probabilities comprise:
according to the transmission requirement, the time restriction, the budget restriction and a transmission time which is smaller than or equal to the time restriction, the operation unit calculating a maximum flow in each of the arcs in the minimal path per unit time, wherein the maximum flow is a capacity of the arc;
defining a capacity vector comprising the capacities of the arcs, the capacities being stochastic to correspond with the flow distribution state of the flow network;
the operation unit executing a budget check to check if a transmission cost satisfies the budget restriction for sending the transmission requirement in the minimal path;
defining the capacity vector as a lower boundary vector when the transmission cost and the transmission time of the minimal path are less than or equal to the budget restriction and the time restriction respectively; and
the operation unit calculating the probability that the capacity vector of any path is larger than or equal to the lower boundary vector of the minimal path, and defining said probability as the feasible probability of the flow network.

6. The system reliability evaluation method for routing policy of claim 5, wherein the steps of the operation unit executing a the budget check comprise:
the operation unit calculating the transmission cost of sending the transmission requirement in the minimal path;
the operation unit comparing the values of the transmission cost and the budget restriction; and
according to the comparison result, the operation unit judging if the lower boundary vector of the minimal path exists.

7. The system reliability evaluation method for routing policy of claim 1, wherein a inclusion—exclusion rule, a disjoint-event method and a state-space decomposition are applied in step of the operation unit calculating the feasible probabilities.

8. The system reliability evaluation method for routing policy of claim 1, further comprising: defining an expectation of the transmission ability of the flow network as product of the system reliability and the transmission requirement.

9. The system reliability evaluation method for routing policy of claim 1, further comprising: defining an expectation of the transmission time of the flow network as product of the system reliability and the time restriction.

10. A non-transitory computer readable medium having instructions for a system reliability evaluation method for routing policy, the instructions which when executed on a computer having an input unit, an operation unit, a storage unit, and an output unit, executes a reliability evaluation software which provides a virtual network for simulating a flow network, the virtual network having a start node, a terminal node and plural arcs between the start node and the terminal node for constituting plural minimal paths, the steps of the method comprising:
sending a transmission requirement, a time restriction and a budget restriction inputted by users to the input unit, wherein the transmission requirement is data sent through the virtual network;
defining a transmission time as time for sending the transmission requirement from the start node to the terminal node, and the transmission time lower than or equal to the time restriction in the reliability evaluation software;
defining each of the minimal paths as an ordered sequence of the arcs from the start node to the terminal node without loops in the virtual network of the reliability evaluation software;
defining the minimal paths of the virtual network including a first minimal path and a second minimal path in the reliability evaluation software, and setting the transmission requirement into the first minimal path of the virtual network;
judging whether the first minimal path is in a feasible state or an unfeasible state using the operation unit, wherein the feasible state is the flow network larger than or equal to the transmission requirement, and the unfeasible state is the flow network smaller than the transmission requirement;
if the first minimal path is in a feasible state, the operation unit calculating a first feasible probability of the first minimal path in the virtual network according to the transmission requirement, the time restriction and the budget restriction, wherein the first feasible probability is a probability of the flow network larger than or equal to the transmission requirement;
if the first minimal path is in an unfeasible state, setting the transmission requirement into the second minimal path of the virtual network and calculating a first unfeasible probability of the first minimal path and the second feasible probability of the second minimal path in the virtual network in the virtual network according to the transmission requirement, the time restriction and the budget restriction, wherein the first unfeasible probability is a probability of the flow network smaller than the transmission requirement, and the second feasible probability is a probability of the flow network larger than or equal to the transmission requirement;

the operation unit integrating the first feasible probability, the first unfeasible probability and the second feasible probability into a system feasible probability of the virtual network, and defining the system feasible probability as a system reliability of the flow network; and displaying the system reliability on the output unit.

* * * * *